United States Patent
Koskinen et al.

(10) Patent No.: US 7,424,102 B2
(45) Date of Patent: Sep. 9, 2008

(54) CHARGING FOR AN IP BASED COMMUNICATION SYSTEM

(75) Inventors: Juha-Pekka Koskinen, Hameenlinna (FI); Juha R. Vallinen, Tampere (FI)

(73) Assignee: Nokia Corporation, Espoo (FI)

( * ) Notice: Subject to any disclaimer, the term of this patent is extended or adjusted under 35 U.S.C. 154(b) by 555 days.

(21) Appl. No.: 10/518,718

(22) PCT Filed: Jun. 28, 2002

(86) PCT No.: PCT/IB02/03267

§ 371 (c)(1),
(2), (4) Date: Dec. 21, 2004

(87) PCT Pub. No.: WO2004/004301

PCT Pub. Date: Jan. 8, 2004

(65) Prior Publication Data

US 2005/0271193 A1 Dec. 8, 2005

(51) Int. Cl.
*H04M 15/00* (2006.01)
(52) U.S. Cl. .......................... 379/114.22; 379/114.21; 379/114.23; 370/352
(58) Field of Classification Search ............ 379/114.01, 379/114.03, 114.21, 114.22, 114.23, 114.15, 379/114.17, 114.2, 114.28, 114.29, 126, 379/127.03, 127.05; 370/259, 351, 352, 370/493, 495; 455/405–408
See application file for complete search history.

(56) References Cited

U.S. PATENT DOCUMENTS

| 5,666,405 | A | 9/1997 | Weber |
| 6,181,927 | B1 | 1/2001 | Welling, Jr. et al. |
| 6,240,402 | B1* | 5/2001 | Lynch-Aird ............ 379/114.21 |
| 6,442,257 | B1* | 8/2002 | Gundlach ............... 379/114.01 |
| 2002/0065785 | A1 | 5/2002 | Tsuda |
| 2002/0191597 | A1* | 12/2002 | Lundstrom ................ 370/356 |
| 2005/0007976 | A1* | 1/2005 | Koskinen et al. ........... 370/328 |

FOREIGN PATENT DOCUMENTS

| EP | 0 452 591 A2 | 10/1991 |
| WO | WO 02/052833 | 7/2002 |

OTHER PUBLICATIONS

3GPP TS 32.225 V1.5.0 (May 2002); *Technical Specification; 3rd Generation Partnership Project; Technical Specification Group; Telecommunication Management; Charging Management; Charging Data Description for IP Multimedia Subsystem*; (Release 5); XP009076534, pp. 1-101.

3GPP TS 32.200 V4.2.0 (Jun. 2002), Digital cellular telecommunications system(Phase 2+); "*3rd Generation Partnership Project; Technical Specification Group Services and System Aspects; Telecommunication management; Charging management; Charging principles*" Release 4, pp. 1-66.

European Office Action for application No. 02 755 491.4-2414 dated Mar. 2, 2007.

Zander, "Evaluation of Diameter Protocol Against IPFIX Requirements," <draft-zander-ipfix-diameter-eval-00.txt>, Sep. 2002, pp. 1-12, retrieved from the Internet: URL:ftp://ftp.rfc-editor.org/in-notes/net-drafts/draft-zander-ipfix-diameter-eval-00.txt.

\* cited by examiner

*Primary Examiner*—Quoc D Tran
(74) *Attorney, Agent, or Firm*—Squire, Sanders & Dempsey L.L.P.

(57) ABSTRACT

There is disclosed a method for charging for services in a communication system supporting a Diameter IP protocol, comprising defining at least one attribute value pair to define sponsorship information.

22 Claims, 3 Drawing Sheets

CHARGING FOR AN IP BASED COMMUNICATION SYSTEM

FIELD OF THE INVENTION

The present invention relates to the provision of charging services in Internet protocol networks, and particularly to shared charging services.

BACKGROUND OF THE INVENTION

Diameter is an IETF protocol that has been specifically designed for the Internet infrastructure. Diameter unifies authentication, authorization and accounting (AAA) transactions.

The accounting related extension (AAA) of the base Diameter protocol is likely to be used in networks which are all-IP (Internet Protocol) based for charging purposes.

Furthermore, in all-IP based networks, it will be essential to provide a mechanism for transferring sponsorship information to a centralized charging function. In this context, sponsorship refers to the 'underwriting' by a third party of part or all of the costs of a communication session established by a user of a communication system. Thus, when a user makes a call, a third party may agree to pay for (i.e. sponsor) a certain part of the costs associated with that call.

The principle of shared charging is discussed in United Kingdom patent application number 0031459.1.

However, no provision for accommodating sponsorship in charging mechanisms has yet been provided for in relation to implementations of all-IP networks.

It is an object of the present invention to provide an improved technique for accommodating charging in IP networks, which addresses the above-stated problems.

SUMMARY OF THE INVENTION

According to the present invention there is provided a method for charging for services in a communication system supporting a Diameter IP protocol, comprising defining at least one attribute value pair to define sponsorship information.

There is preferably provided an attribute value pair defining shared charging information.

There is preferably provided an attribute value pair defining shared percentage information. There is preferably provided an attribute value pair defining shared amount information. There is preferably provided an attribute value pair defining a sponsor identity.

The method may comprise receiving a request to establish an IP session from a user of the system; initiating an account with an account controller of the system; establishing the IP session; and initiating the monitoring of the account.

The step of initiating an account may comprise transferring sponsorship information to a charging system, the charging system being responsible for monitoring of the account.

The sponsorship information may be transferred from an application server.

The account may be initiated responsive to an account request message.

The monitoring of the account may be initiated responsive to an account request message.

According to the present invention there is further provided a communication system supporting a Diameter IP protocol and for charging for services, wherein the Diameter protocol is adapted to define at least one attribute value pair to define sponsorship information.

The attribute value pair may define shared charging information. The attribute value pair may define shared percentage information. The attribute value pair may define shared amount information. The attribute value pair may define a sponsor identity.

In a further aspect the present invention provides a Diameter IP protocol adapted to define at least one attribute value pair to define sponsorship information The Diameter IP protocol sponsorship information may be provided to enable shared charging.

According to another aspect the present invention provides a communication system comprising: call control function means adapted to initiate a call session for a user of the system; an application server for providing an application for a user of the system in a call session; and a charging means for charging a call session for a user, wherein the call control function means, the application server and the charging means are adapted to communicate using a Diameter IP protocol.

The call control function means may be a serving call state control function.

The charging means may comprise an on-line charging function and an off-line charging function.

The charging may be initiated on the basis of a Diameter IP communication between the call control function and the charging means.

Shared charging information may be communicated to the charging means from the application function on the basis of a Diameter IP communication.

The charging means may monitor the call session charges responsive to a Diameter IP communication from the call control function.

Thus, in accordance with a preferred embodiment of the present invention, shared charging information is introduced into the Diameter protocol. The invention thus advantageously provides an enhancement to the Diameter charging capability, and provides a mechanism for effective sponsorship in all-IP networks.

BRIEF DESCRIPTION OF THE DRAWINGS

For a better understanding of the present invention and as to how the same can be carried into effect, reference will now be made by way of example to the accompanying drawings in which.

DESCRIPTION OF THE PREFERRED EMBODIMENTS

The present invention is described herein with reference to a particular illustrative embodiment. However, such embodiment is presented for the purposes of illustrating the present invention, and does not limit the scope thereof.

In particular, the present invention is described herein with reference to a particular example of a UMTS network supporting user equipment, such as a mobile station, and providing connections for the user equipment to external IP networks.

Figure 1:
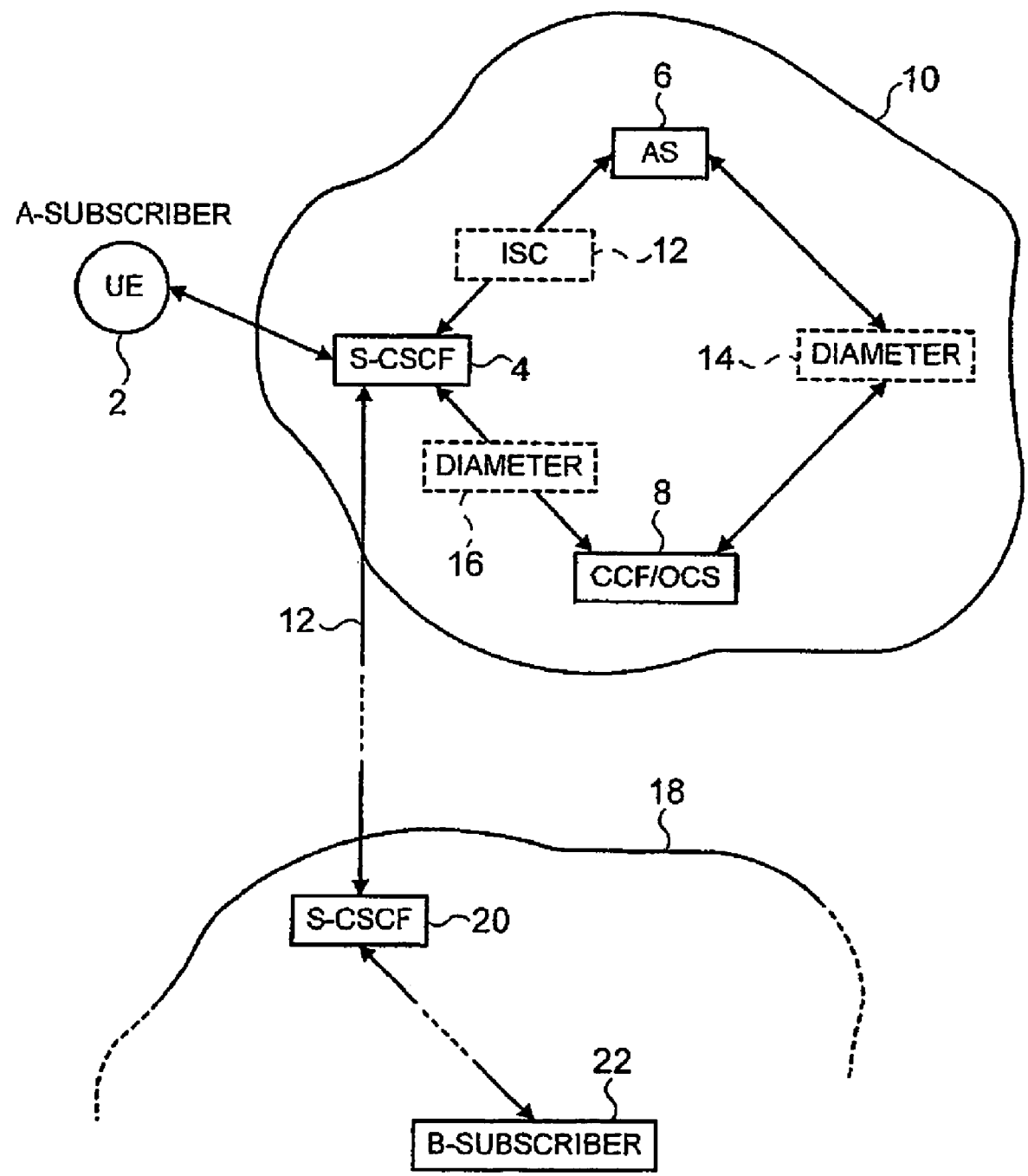
FIG. 1 illustrates the main network elements in an example implementation of the present invention.

Referring to FIG. 1, there is illustrated the main elements of a UMTS network implementing an all-IP Diameter protocol system for the purposes of describing the present invention. In FIG. 1 only those elements of a UMTS system necessary for supporting the Diameter protocol charging in accordance with the present invention are illustrated. The full implementation of such a system will be apparent to one skilled in the art.

FIG. 1 illustrates generally a UMTS network infrastructure 10 including a serving call state control function (S-CSCF) 4, a combined charging collector function (CCF) and online charging system (OCS) 8, and an application server (AS) 6. The S-CSCF 4 supports a call session for the user equipment, such as user equipment 2, connected in the UMTS network 10. The CCF provides the centralized charging function for offline charging, and the OCS provides the centralized charging for online charging. The S-CSCF 4 additionally has a connection 12 to an IP network or element of an IP network external to the UMTS network 10, as described further hereinbelow. In particular, the connection 12 connects to a service provider or terminating part with which the user equipment 2 establishes a session.

The UMTS network provides access to other, external IP services or networks for the user equipment 2. For the purposes of the present example, it is assumed that a call session is to be established between the user equipment 2, and a B-subscriber 22 in a further IP network 18. The further IP network 18 supports the call session for the B-subscriber 22 with a serving call state control function (S-CSCF) 20. For the purposes of this example, as the initiating caller the user equipment 2 is considered to be the A-subscriber. For the purposes of supporting the call session, the connection 12 is between the respective S-CSCFs of the respective subscribers.

The B-subscriber may, for example, be a further user equipment or a service provided by a third party.

FIG. 1 also illustrates the protocol interfaces for the various IP network elements. The S-CSCF 4 is connected to the AS 6 via an ISC interface represented by block 12. The ISC interface may, for example, be a session initiation protocol (SIP) interface. The CCF/OCS 8 is connected to the S-CSCF 4 via a Diameter protocol represented by block 16. The CCF/OCS 8 is connected to the AS 6 via a diameter protocol represented by block 14.

The principle of shared charging enables operators and/or the terminating user to co-operate to share or distribute the charges for a call. In conventional charging the user responsible for originating the call bears the full cost of the call. Under a shared or sponsored charging regime the user of the terminating part may bear part of the cost, either voluntarily or under requirement from an operator.

The preferred embodiment of the present invention proposes the use of shared charging information in a Diameter protocol as new AVPs (attribute value pairs) or as part of an existing grouped Service-Parameter-Info AVP.

The sponsorship charging information in a Diameter ACR (accounting request) may preferably be defined with four AVPs: shared charging information; shared percentage information; shared amount information; and sponsor identity information. These are described in more detail in turn hereinbelow.

The type of shared charging information may preferably be indicated by a code according to Table 1.

TABLE 1

| Shared charging code | Description |
| --- | --- |
| 00 | Normal charging - Charges not shared. Used when the user of the terminating part or the service provider is not to bear any of the cost of the call. The originating subscriber is charged for the full cost of the call. |
| 01 | Network access fee - Indicates that the user of the terminating part or the service provider will bear part or all of the network access charge. |
| 02 | Transferred data towards used service - Indicates that the user of the terminating part or the service provider will bear part or all of the cost of transferring data towards a used service. |
| 03 | Used service - Indicates that the user of the terminating part or the service provider will bear part or all of the cost of a used service. |
| 04 | CallControl and MobilityManagement - Indicates that the user of the terminating part or the service provider will bear part or all of the charge due to call routing and mobility management (in the CallProcessing server). |
| 05 | Total cost of transaction excluding other services' fees - Indicates that the user of the terminating part or the service provider will bear a proportion of the total charge of the call excluding the charge for the use of supplementary/value-added services. |
| 06 | Total cost of transaction - Indicates that the user of the terminating part or the service provider will bear a proportion of the total charge of the call. |

Table 1 includes examples of shared charging information. Other types of shared charging may be used in addition to or instead of those listed above when needed.

The shared percentage information, implemented as an AVP, has a value which defines the amount of the fee (0-100%) that the service provider or terminating part is willing to pay, according to shared charging alternatives.

The shared amount information, implemented as an AVP, has a value that defines the fixed amount of the fee which the service provider or terminating part is willing to pay, according to shared charging alternatives. If the fixed amount is used, the shared percentage must be set to zero.

The sponsor identity information, implemented as an AVP, defines the identity of the party willing to pay the sponsored part.

Figure 2:
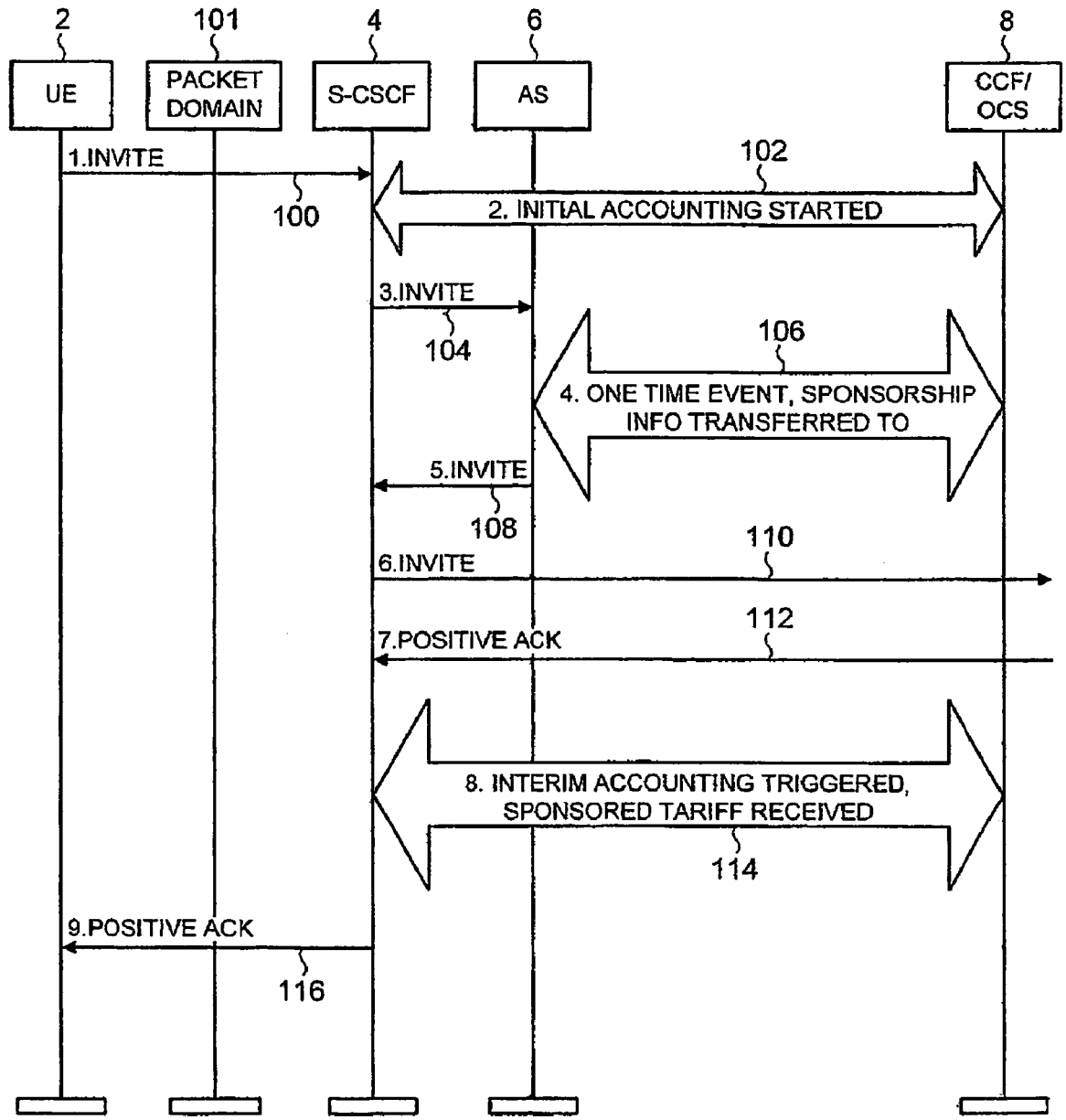
FIG. 2 illustrates the signaling in a preferred embodiment of the present invention.
Figure 3A:
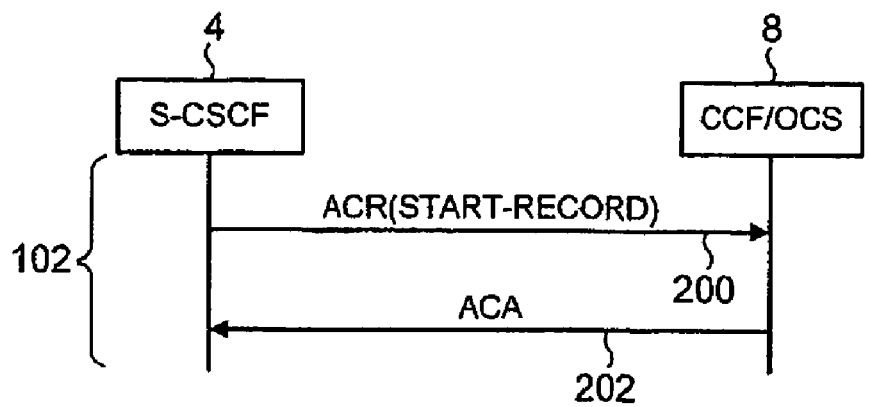
FIG. 3(*a*) to 3(*c*) illustrate further details of the signaling of FIG. 2.
Figure 3B:
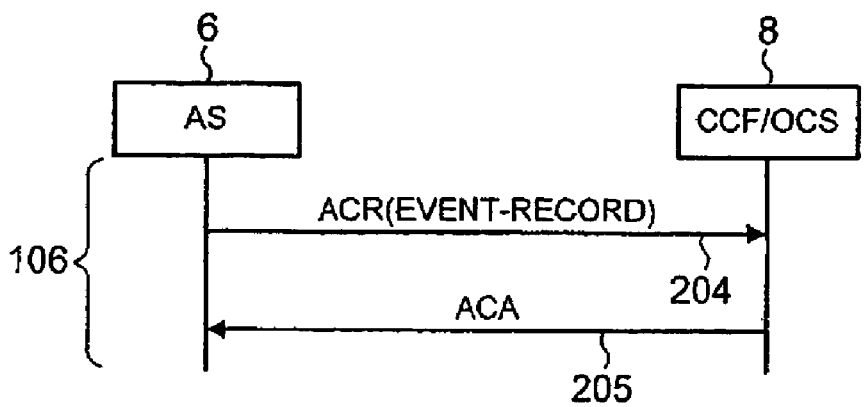
Figure 3C:
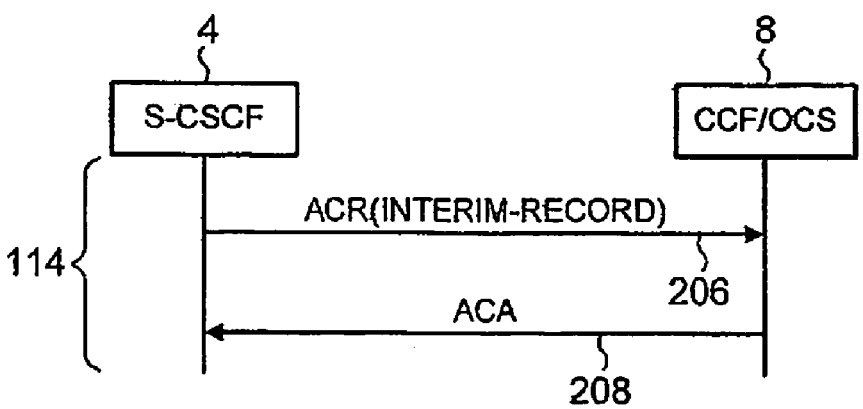

Referring to FIGS. 2 and 3, an example embodiment of the present invention is now described.

In a first step, user equipment 2 transmits an INVITE message 100 in the packet domain—as represented by block 101 to the serving call state control function (S-CSCF) 4 allocated to the call session.

Responsive thereto, in the preferred embodiment an initial accounting is started by the S-CSCF 4. As represented by Diameter protocol communication exchange 102 in FIG. 2, and shown in further detail in FIG. 3(a), the S-CSCF sends an ACR(START_RECORD) accounting request message 200 to the CCF/OCS 8. The CCF/OCS 8 replies with an ACA accounting acknowledgement message 202. If the user equipment 2 is a pre-paid user, an initial threshold value is also sent to the S-CSCF 4 by the CCF/OCS 8.

Following the start of the initial accounting, the S-CSCF 4 transmits an INVITE message 104 to the AS 6.

The AS 6 preferably performs a one-time event, as represented by Diameter protocol communication 106. As shown in further detail in FIG. 3(*b*), the AS 6 sends an ACR(EVENT_RECORD) account request message 204 to the CCF/OCS 8. This ACR includes any sponsorship information, where the AS 6 confirms its identity and also that it will pay a percentage, or a predetermined fixed amount, of certain charges. In the present example, the AS 6 informs the CCF/OCS 8 that it intends to pay for 50% of the Call Control charges and 50% of the mobility management charges, as charged by the S-CSCF 4. The CCF/OCS 8 stores this information. The CCF/OCS 8 replies with an ACA accounting acknowledgement message 205.

Thereafter, the AS 6 returns an INVITE message 108 to the S-CSCF 4. The S-CSCF then forwards an INVITE message 110 towards the terminating party (the B-subscriber 22), i.e. the recipient of the call session initiated by the user equipment 2.

Responsive to satisfactory acceptance of the call, in accordance with known techniques, the terminating party returns a positive acknowledgement message 112 to the S—CSCF 4, which message may be a 2000K message.

Responsive to receipt of the acknowledgement message, interim accounting is triggered from the S—CSCF 4 to the CCF/OCS B, as represented by Diameter protocol communication 114 in FIG. 2.

As shown in further detail in FIG. 3(*c*), the S-CSCF 4 sends an ACR(INTERIM_RECORD) account request message 206 to the CCF/OCS 8 to obtain a final tariff for the connection. In the present example, referring again to FIG. 3(*c*), an ACA account acknowledgement message 208 is sent from the CCF/OCS 8 to the S-CSCF 4, which message includes the new tariff. More importantly, in a pre-paid user scenario, a new threshold value is sent from the CCF/OCS 8 to the S-CSCF 4.

Finally, a positive acknowledgement is transmitted from the S-CSCF 4 to the User equipment 2.

From the above description, and from the protocol interfaces shown in FIG. 1, it will be apparent that the communications 102, 106, 114 represent Diameter protocol communications, and the other communications of FIG. 2 are, for example, SIP or ISC protocol communications.

Thus the present invention provides for the actual charge towards each party to be determined for a Diameter protocol system.

The present invention is described herein with reference to examples of preferred embodiments for the purpose of illustration, and is not limited to any such embodiments. The scope of the present invention is defined by the appended claims.

The invention claimed is:

1. A method comprising:
   receiving a request to establish an internet protocol (IP) session from a user of a communication system supporting a diameter IP protocol;
   initiating an account with an account controller of the system, wherein the initiating comprises transferring sponsorship information to a charging system from an application server, said sponsorship information being provided to enable shared charging, the charging system being responsible for monitoring of the account;
   establishing the IP session; and
   initiating the monitoring of the account responsive to an account request message from said account controller to obtain a final tariff.

2. A method according to claim 1 wherein the account is initiated responsive to an account request message.

3. A method according to claim 1 wherein the sponsorship information is defined by at least one attribute value pair.

4. A method according to claim 3 further comprising providing an attribute value pair defining shared charging information.

5. A method according to claim 3 further comprising providing an attribute value pair defining shared percentage information.

6. A method according to claim 3 further comprising providing an attribute value pair defining shared amount information.

7. A method according to claim 3 further comprising providing an attribute value pair defining a sponsor identity.

8. A communication system comprising:
   a control function configured to initiate an internet protocol (IP) session for a user of the system, wherein the system supports a diameter IP protocol;
   an application server configured to provide an application for a user of the system in an IP session;
   an account controller configured to initiate an account;
   a charging unit configured to charge an IP session for a user, wherein the charging unit is configured to receive sponsorship information to enable shared charging from the application server on initiation of the account, and is configured to monitor the account responsive to an account request message from said control function to obtain a final tariff.

9. A communication system according to claim 8 wherein the control function comprises a serving call state control function.

10. A communication system according to claim 8 wherein the charging unit comprises an on-line charging function and an off-line charging function.

11. A communication system according to claim 8, wherein the charging is initiated on the basis of a diameter IP communication between the call control function and the charging unit.

12. A communication system according to claim 8, wherein shared charging information is communicated to the charging unit from the application function on the basis of a diameter IP communication.

13. A communication system according to claim 8, wherein the charging unit is configured to monitor the call session charges responsive to a diameter IP communication from the call control function.

14. A communication system according to claim 8 wherein the diameter protocol is configured to define at least one attribute value pair to define sponsorship information.

15. A communication system according to claim 14 wherein the attribute value pair is configured to define shared charging information.

16. A communication system according to claim 14 wherein the attribute value pair is configured to define shared percentage information.

17. A communication system according to claim 14 wherein the attribute value pair is configured to define shared amount information.

18. A communication system according to claim 14 wherein the attribute value pair is configured to define a sponsor identity.

19. A diameter internet protocol (IP) configured to define at least one attribute value pair to define sponsorship information.

20. A diameter IP protocol according to claim 19 wherein the sponsorship information is provided to enable shared charging.

21. An apparatus comprising:

a receiver configured to receive a request to establish an internet protocol (IP) session from a user of a communication system supporting a diameter IP protocol;

an initiating unit configured to initiate an account with an account controller of the system, wherein the initiating comprises transferring sponsorship information to enable shared charging from the application to a charging system, the charging system being responsible for monitoring of the account; and an establishing unit configured to establish the IP session and to send an account request message to obtain a final tariff to a charging system, thereby to initiate the monitoring of the account.

22. An apparatus comprising:

receiving means for receiving a request to establish an internet protocol (IP) session from a user of a communication system supporting a diameter IP protocol;

initiating means for initiating an account with an account controller of the system, wherein the initiating means comprises means for transferring sponsorship information to enable shared charging from an application server to a charging system, the charging system being responsible for monitoring of the account;

establishing means for establishing the IP session; and sending means for sending an account request message to obtain a final tariff to a charging system, thereby to initiate the monitoring of the account.

* * * * *